US012666298B2

(12) United States Patent
Pakrooh et al.

(10) Patent No.: US 12,666,298 B2
(45) Date of Patent: Jun. 23, 2026

(54) RADIO FREQUENCY SENSING WITH CHANNEL IMPULSE RESPONSE

(71) Applicant: QUALCOMM Incorporated, San Diego, CA (US)

(72) Inventors: Pooria Pakrooh, San Marcos, CA (US); Stephen Jay Shellhammer, Ramona, CA (US); Bin Tian, San Diego, CA (US); Ishaque Ashar Kadampot, Augusta, GA (US); Koorosh Akhavan, San Diego, CA (US); Le Nguyen Luong, San Diego, CA (US); Alexandros Manolakos, Athens (GR); Varun Amar Reddy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 18/706,175

(22) PCT Filed: Apr. 6, 2022

(86) PCT No.: PCT/US2022/071570
§ 371 (c)(1),
(2) Date: Apr. 30, 2024

(87) PCT Pub. No.: WO2023/140965
PCT Pub. Date: Jul. 27, 2023

(65) Prior Publication Data
US 2024/0430727 A1 Dec. 26, 2024

(30) Foreign Application Priority Data
Jan. 18, 2022 (GR) ............................... 20220100044

(51) Int. Cl.
| | |
|---|---|
| *H04W 24/10* | (2009.01) |
| *H04B 1/7163* | (2011.01) |
| *H04B 7/04* | (2017.01) |
| *H04L 25/02* | (2006.01) |

(52) U.S. Cl.
CPC .......... *H04W 24/10* (2013.01); *H04B 1/7163* (2013.01); *H04B 7/04* (2013.01); *H04L 25/0212* (2013.01); *H04L 25/0224* (2013.01)

(58) Field of Classification Search
CPC .... H04W 24/10; G01S 13/582; G01S 13/765; H04B 1/7163; H04B 7/04; H04L 25/0224; H04L 25/0212
See application file for complete search history.

(56) References Cited

U.S. PATENT DOCUMENTS

| | | | |
|---|---|---|---|
| 6,980,646 B1 * | 12/2005 | Demirekler | ........... H04M 9/082 379/406.11 |
| 12,052,051 B2 | 7/2024 | Tertinek et al. | |

(Continued)

FOREIGN PATENT DOCUMENTS

| | | |
|---|---|---|
| EP | 3819657 A1 | 5/2021 |
| EP | 3869223 A1 | 8/2021 |
| WO | 2021089258 A1 | 5/2021 |

OTHER PUBLICATIONS

Leong F (NXP Semiconductors): "UWB Sensing in 802.15", IEEE Draft, 15-21-0399-00-04AB-UWB-Sensing-In-802-15, IEEE-SA Mentor, Piscataway, NJ USA, vol. 802.15.4ab, Jul. 16, 2021, pp. 1-14, XP068182597, Slides 4-6, 12-14.

(Continued)

*Primary Examiner* — Mounir Moutaouakil
(74) *Attorney, Agent, or Firm* — Harrity & Harrity, LLP

(57) ABSTRACT

Various aspects of the present disclosure generally relate to wireless communication. In some aspects, an initiating device may transmit a signal that includes multiple packets.

(Continued)

The initiating device may receive, from a responding device, a channel impulse response (CIR) report for each packet of the multiple packets. The initiating device may align, using one or more taps in the CIR report for each packet, the CIR reports across the multiple packets to identify a target object, a location of the target object, or a movement of the target object. The initiating device may perform an action based at least in part on the target object, the location of the target object, or the movement of the target object. Numerous other aspects are described.

28 Claims, 9 Drawing Sheets

(56) References Cited

U.S. PATENT DOCUMENTS

| | | | | |
|---|---|---|---|---|
| 12,489,534 | B2 * | 12/2025 | Hosseini | H04B 17/328 |
| 12,519,678 | B2 * | 1/2026 | Pakrooh | H04L 25/0212 |
| 2013/0272170 | A1 * | 10/2013 | Chatterjee | H04W 76/19 |
| | | | | 370/280 |
| 2018/0034731 | A1 * | 2/2018 | Yang | H04L 25/022 |
| 2020/0278438 | A1 * | 9/2020 | Huang | G01S 7/038 |
| 2020/0287728 | A1 * | 9/2020 | Danev | H04W 12/104 |
| 2020/0309932 | A1 | 10/2020 | Zeng et al. | |
| 2020/0319301 | A1 * | 10/2020 | Qiu | G06V 10/431 |
| 2021/0409067 | A1 | 12/2021 | Zeng et al. | |
| 2023/0209377 | A1 | 6/2023 | Parker et al. | |
| 2024/0029546 | A1 * | 1/2024 | Lopareva | G01S 7/415 |

OTHER PUBLICATIONS

International Search Report and Written Opinion—PCT/US2022/071570—ISA/EPO—Oct. 4, 2022.
Certified Copy of EP21214097, filed on Dec. 13, 2021, 36 Pages.
Fraunhofer Iis., et al., "Potential Positioning Enhancements for Multipath/NLOS Mitigation", R1-2105865, 3GPP TSG RAN WG1 Meeting #105-e e-Meeting, May 10-27, 2021, 7 Pages.

* cited by examiner

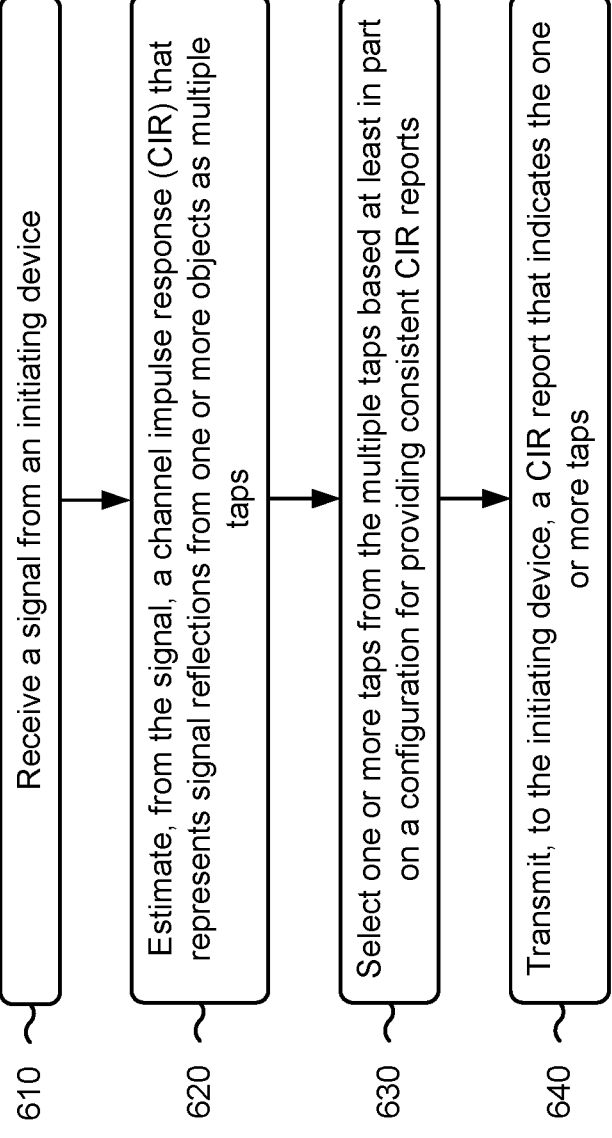

610 — Receive a signal from an initiating device

620 — Estimate, from the signal, a channel impulse response (CIR) that represents signal reflections from one or more objects as multiple taps 630 — Select one or more taps from the multiple taps based at least in part on a configuration for providing consistent CIR reports 640 — Transmit, to the initiating device, a CIR report that indicates the one or more taps

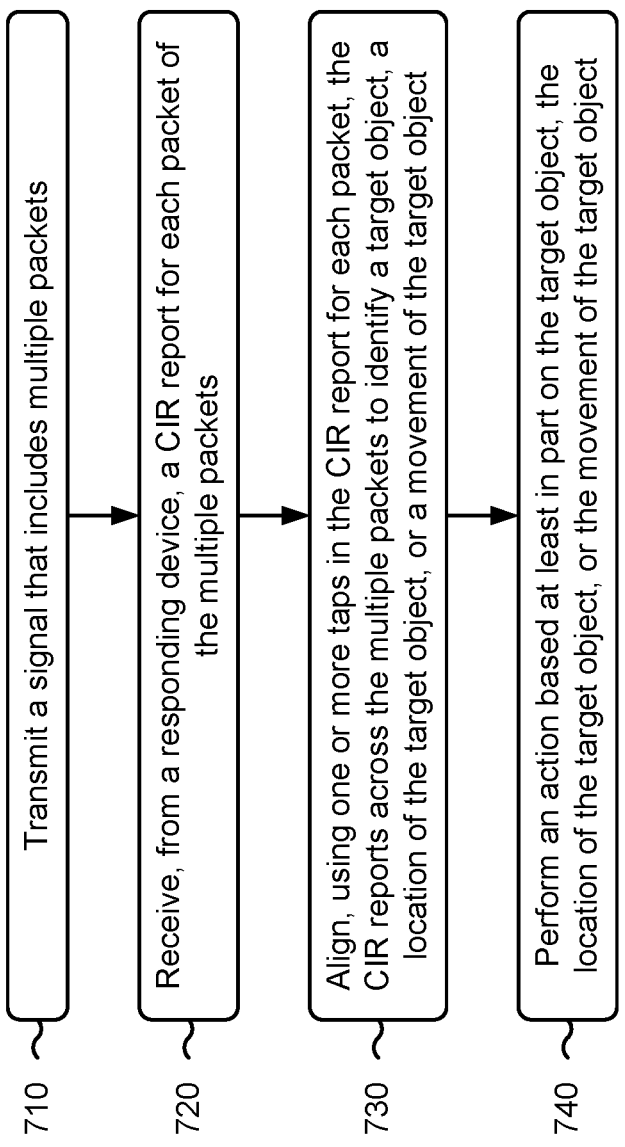

710    Transmit a signal that includes multiple packets

720    Receive, from a responding device, a CIR report for each packet of the multiple packets 730    Align, using one or more taps in the CIR report for each packet, the CIR reports across the multiple packets to identify a target object, a location of the target object, or a movement of the target object 740    Perform an action based at least in part on the target object, the location of the target object, or the movement of the target object

RADIO FREQUENCY SENSING WITH CHANNEL IMPULSE RESPONSE

CROSS-REFERENCE TO RELATED APPLICATION

This application is a 371 National Stage of PCT Application No. PCT/US2022/071570, filed on Apr. 6, 2022, entitled "RADIO FREQUENCY SENSING WITH CHANNEL IMPULSE RESPONSE", and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for radio frequency sensing using channel impulse responses.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP). Other technologies may include ultra-wideband (UWB) technologies.

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a responding device. The method may include receiving a signal from an initiating device, and estimating, from the signal, a channel impulse response (CIR) that represents signal reflections from one or more objects as multiple taps. The method may include selecting one or more taps from the multiple taps based at least in part on a configuration for providing consistent CIR reports. The method may include transmitting, to the initiating device, a CIR report that indicates the one or more taps.

Some aspects described herein relate to a method of RF sensing performed by an initiating device. The method may include transmitting a signal that includes multiple packets. The method may include receiving, from a responding device, a CIR report for each packet of the multiple packets. The method may include aligning, using one or more taps in the CIR report for each packet, the CIR reports across the multiple packets to identify a target object, a location of the target object, or a movement of the target object. The method may include performing an action based at least in part on the target object, the location of the target object, or the movement of the target object.

Some aspects described herein relate to a responding device for wireless communication. The responding device may include a memory and one or more processors coupled to the memory. The one or more processors may be configured to receive a signal from an initiating device and estimate, from the signal, a CIR that represents signal reflections from one or more objects as multiple taps. The one or more processors may be configured to select one or more taps from the multiple taps based at least in part on a configuration for providing consistent CIR reports. The one or more processors may be configured to transmit, to the initiating device, a CIR report that indicates the one or more taps.

Some aspects described herein relate to an initiating device for wireless communication. The initiating device may include a memory and one or more processors coupled to the memory. The one or more processors may be configured to transmit a signal that includes multiple packets. The one or more processors may be configured to receive, from a responding device, a CIR report for each packet of the multiple packets. The one or more processors may be configured to align, using one or more taps in the CIR report for each packet, the CIR reports across the multiple packets to identify a target object, a location of the target object, or a movement of the target object. The one or more processors may be configured to perform an action based at least in part on the target object, the location of the target object, or the movement of the target object.

Some aspects described herein relate to a non-transitory computer-readable medium that stores a set of instructions for wireless communication by a responding device. The set of instructions, when executed by one or more processors of the responding device, may cause the responding device to receive a signal from an initiating device and estimate, from the signal, a CIR that represents signal reflections from one or more objects as multiple taps. The set of instructions, when executed by one or more processors of the responding device, may cause the responding device to select one or more taps from the multiple taps based at least in part on a configuration for providing consistent CIR reports. The set of instructions, when executed by one or more processors of the responding device, may cause the responding device to transmit, to the initiating device, a CIR report that indicates the one or more taps.

Some aspects described herein relate to a non-transitory computer-readable medium that stores a set of instructions for wireless communication. The set of instructions, when executed by one or more processors of an initiating device, may cause the initiating device to transmit a signal that includes multiple packets and receive, from a responding device, a CIR report for each packet of the multiple packets. The set of instructions, when executed by one or more processors of the initiating device, may cause the initiating device to align, using one or more taps in the CIR report for each packet, the CIR reports across the multiple packets to identify a target object, a location of the target object, or a movement of the target object. The set of instructions, when executed by one or more processors of the initiating device, may cause the initiating device to perform an action based at least in part on the target object, the location of the target object, or the movement of the target object.

Some aspects described herein relate to an apparatus for wireless communication. The apparatus may include means for receiving a signal from another apparatus and means for estimating, from the signal, a CIR that represents signal reflections from one or more objects as multiple taps. The apparatus may include means for selecting one or more taps from the multiple taps based at least in part on a configuration for providing consistent CIR reports. The apparatus may include means for transmitting, to the other apparatus, a CIR report that indicates the one or more taps.

Some aspects described herein relate to an apparatus for wireless communication. The apparatus may include means for transmitting a signal that includes multiple packets. The apparatus may include means for receiving, from another apparatus, a CIR report for each packet of the multiple packets. The apparatus may include means for aligning, using one or more taps in the CIR report for each packet, the CIR reports across the multiple packets to identify a target object, a location of the target object, or a movement of the target object. The apparatus may include means for performing an action based at least in part on the target object, the location of the target object, or the movement of the target object.

Aspects generally include a method, apparatus, system, computer program product, non-transitory computer-readable medium, user equipment, base station, access point, UWB device, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a responding device, in accordance with the present disclosure.

FIG. 7 is a diagram illustrating an example process performed, for example, by an initiating device, in accordance with the present disclosure.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

UWB technology may be used to transmit signals with wide bandwidth (e.g., >500 MHZ). Signal energy may be transmitted without interfering with narrowband and carrier wave transmission in the same frequency band. UWB may be used for low-energy, short-range applications, e.g., for ranging. UWB is presently divided into channels 1-15 spanning frequencies from about 3.5 GHz to about 4.5 GHz and from about 6.5 GHz to about 10 GHz.

Figure 1:
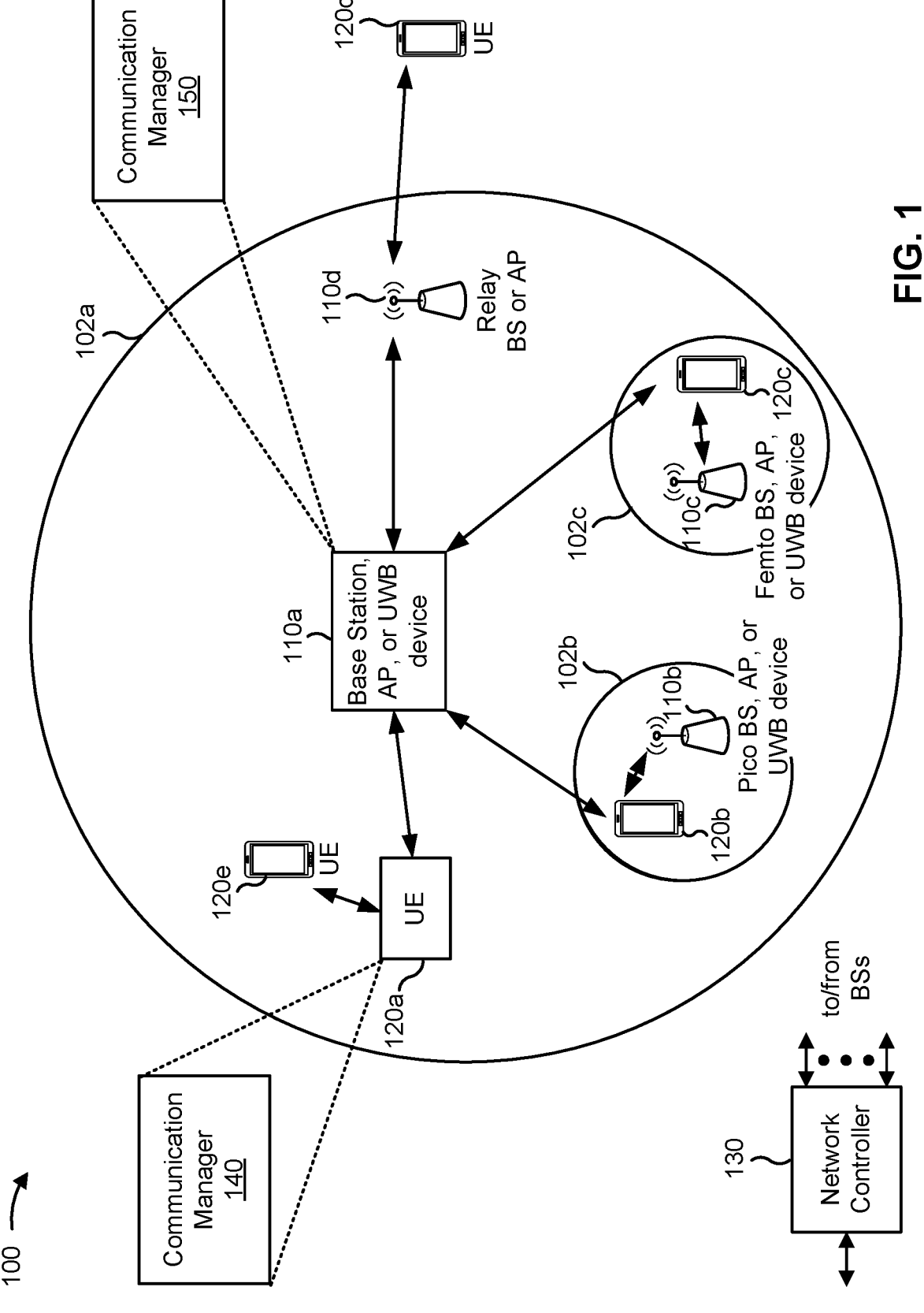
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network, a 4G (e.g., Long Term Evolution (LTE)) network, wide area network (WAN) access points (APs), personal area network (PAN) access points and devices, or UWB devices (e.g., UWB anchor, UWB tag), among other examples. The wireless network 100 may include one or more network entities, such as a base station, AP, or UWB device 110 (shown as BS, AP, or UWB device 110a, pico BS, AP, or UWB device 110b, femto BS, AP, or UWB device 110c, and a relay BS, AP, or UWB device 110d). The wireless network 100 may also include a user equipment (UE) 120 or multiple UEs 120 (shown as a UE 120a, a UE 120b, a UE 120c, a UE 120d, and a UE 120e). A base station, AP, or UWB device 110 is a network entity that communicates with UEs 120. A base station (sometimes referred to as a BS) may include, for example, an NR base station, an LTE base station, a Node B, an eNB (e.g., in 4G), a gNB (e.g., in 5G), and/or a transmission reception point (TRP). Each base station, AP, or UWB device 110 may provide communication coverage for a particular geographic area. In the Third Generation Partnership Project (3GPP), the term "cell" can refer to a coverage area of a base station, AP, or UWB device 110 and/or a base station subsystem serving this coverage area, depending on the context in which the term is used.

In some aspects, the term "base station" or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station. A WAN access point, a PAN access point, a UWB device (e.g., UWB anchor, UWB tag, or other form of a UWB-capable device), and a UWB access point may also be referred to as a "network entity." A network entity may include components described for the base station, AP, or UWB device 110.

A base station, AP, or UWB device 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station for a macro cell may be referred to as a macro base station. A base station for a pico cell may be referred to as a pico base station. A base station for a femto cell may be referred to as a femto base station or an in-home base station. In the example shown in FIG. 1, the BS, AP, or UWB device 110a may be a macro base station, AP, or UWB device for a macro cell 102a, the BS, AP, or UWB device 110b may be a pico base station, AP, or UWB device for a pico cell 102b, and the BS, AP, or UWB device 110c may be a femto base station, AP, or UWB device for a femto cell 102c. A base station may support one or multiple (e.g., three) cells. A network entity may be a macro base station, a pico base station, or a femto base station.

In some examples, a cell may not necessarily be stationary, and the geographic area of the cell may move according to the location of a base station that is mobile (e.g., a mobile base station). In some examples, the base stations, Aps, or UWB devices 110 may be interconnected to one another and/or to one or more other base stations, Aps, or UWB devices 110 or network entities (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS, AP, or UWB device 110*d* (e.g., a relay base station) may communicate with the BS, AP, or UWB device 110*a* (e.g., a macro base station, AP, UWB device) and the UE 120*d* in order to facilitate communication between the BS, AP, or UWB device 110*a* and the UE 120*d*. A base station that relays communications may be referred to as a relay station, a relay base station, a relay, or the like.

The wireless network 100 may be a heterogeneous network that includes base stations of different types, such as macro base stations, pico base stations, femto base stations, relay base stations, or the like. These different types of base stations, different types of APs, or different types of UWB devices may have different transmit power levels, different coverage areas, and/or different impacts on interference in the wireless network 100. For example, macro base stations, APs, or UWB devices may have a high transmit power level (e.g., 5 to 40 watts) whereas pico base stations, APs, or UWB devices, femto base stations, APs, or UWB devices, and relay base stations, APs, or UWB devices may have lower transmit power levels (e.g., 0.1 to 2 watts).

A network controller 130 may couple to or communicate with a set of network entities and may provide coordination and control for these network entities. The network controller 130 may communicate with the network entities via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium. A UE 120 may be capable of UWB communications.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed. In some cases, WANs, PANs, or UWB networks may be deployed.

In some examples, two or more UEs 120 (e.g., shown as UE 120*a* and UE 120*e*) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station, AP, or UWB device 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. A UWB frequency bandwidth may be greater than 500 MHZ. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHZ" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a responding device (e.g., a UE 120, a network entity) may include a communication manager 140 or 150. As described in more detail elsewhere herein, the communication manager 140 or 150 may receive a signal from an initiating device and estimate, from the signal, a channel impulse response (CIR) that represents signal reflections from one or more objects as multiple taps; and select one or more taps from the multiple taps based at least in part on a configuration for providing consistent CIR reports. The communication manager 140 or 150 may transmit, to the initiating device, a CIR report that indicates the one or more taps.

In some aspects, an initiating device (e.g., a UE 120, a network entity) may include a communication manager 140 or 150. As described in more detail elsewhere herein, the communication manager 140 or 150 may transmit a signal that includes multiple packets; and receive, from a responding device, a CIR report for each packet of the multiple packets. The communication manager 140 or 150 may align, using one or more taps in the CIR report for each packet, the CIR reports across the multiple packets to identify a target object, a location of the target object, or a movement of the target object. The communication manager 140 or 150 may perform an action based at least in part on the target object, the location of the target object, or the movement of the target object. Additionally, or alternatively, the communication manager 140 or 150 may perform one or more other operations described herein.

As indicated above, FIG. 1 is provided as an example. Other examples may differ from what is described with regard to FIG. 1.

Figure 2:
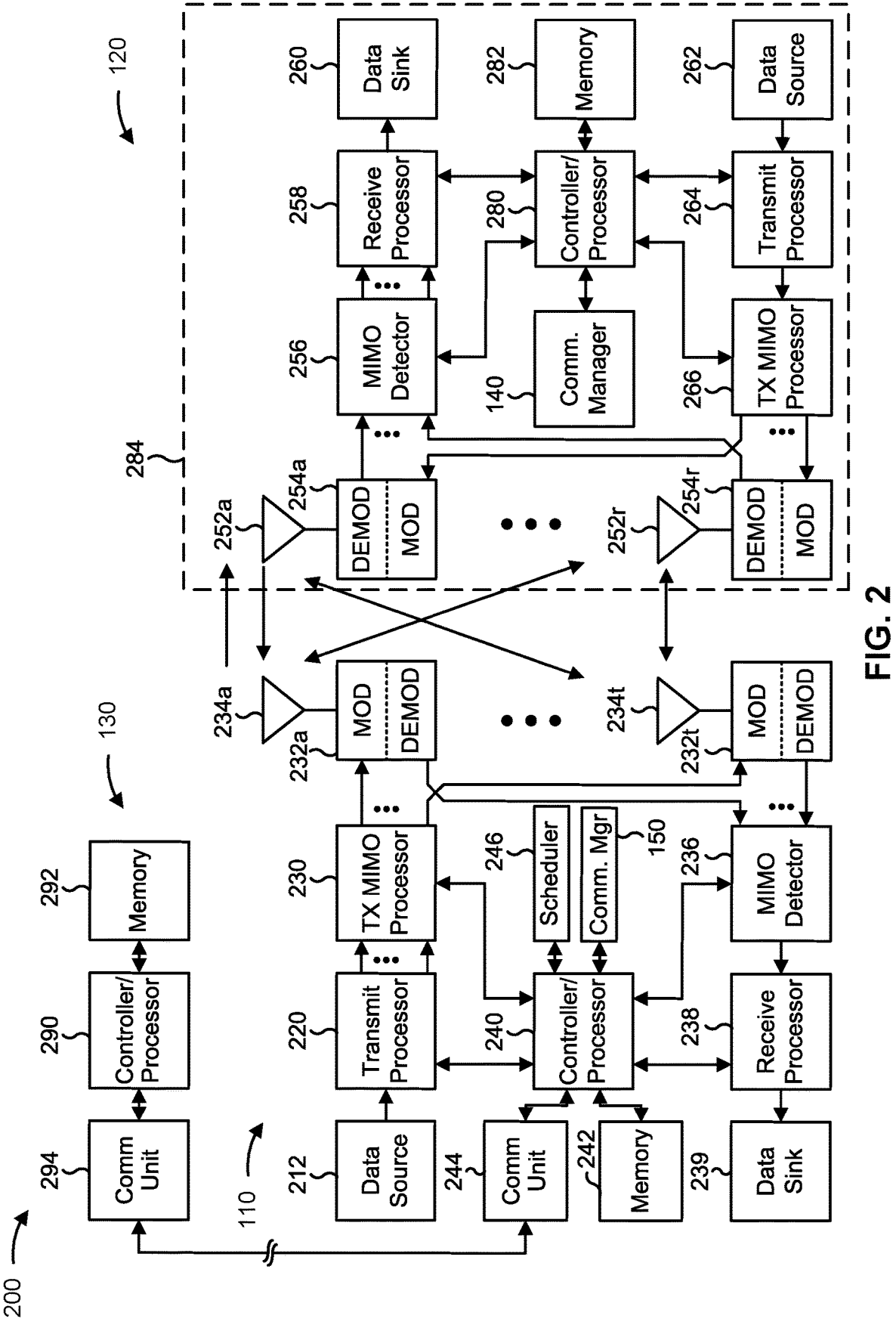
FIG. 2 is a diagram illustrating an example of a base station in communication with a user equipment in a wireless network, in accordance with the present disclosure.

FIG. 2 is a diagram illustrating an example 200 of a network entity (e.g., base station, AP, or UWB device 110 in communication with a UE 120 in a wireless network 100, in accordance with the present disclosure. The base station, AP, or UWB device 110 may be equipped with a set of antennas 234a through 234t, such as T antennas (T≥1). The UE 120 may be equipped with a set of antennas 252a through 252r, such as R antennas (R≥1). A WAN access point may also include components as described for the base station, AP, or UWB device 110 and may also operate in accordance with Institute of Electrical Engineers (IEEE) standards (e.g., IEEE 802).

At the base station, AP, or UWB device 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station, AP, or UWB device 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station AP, or UWB device 110 and/or other base stations, Aps, or UWB devices 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the network entity (e.g., base station, AP, or UWB device 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

A controller/processor of a network entity (e.g., the controller/processor 240 of the base station, AP, or UWB device 110), the controller/processor 280 of the UE 120, and/or any other component(s) of FIG. 2 may perform one or more techniques associated with RF sensing, as described in more detail elsewhere herein. For example, the controller/processor 240 of the base station, AP, or UWB device 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a responding device (e.g., a UE 120, a network entity) includes means for receiving a signal from an initiating device and means for estimating, from the signal, a CIR that represents signal reflections from one or more objects as multiple taps; means for selecting one or more taps from the multiple taps based at least in part on a configuration for providing consistent CIR reports; and/or means for transmitting, to the initiating device, a CIR report that indicates the one or more taps. In some aspects, the means for the responding device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the responding device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an initiating device (e.g., a UE 120, a network entity) includes means for transmitting a signal that includes multiple packets; means for receiving, from a responding device, a CIR report for each packet of the multiple packets; means for aligning, using one or more taps in the CIR report for each packet, the CIR reports across the multiple packets to identify a target object, a location of the target object, or a movement of the target object; and/or means for performing an action based at least in part on the target object, the location of the target object, or the movement of the target object. In some aspects, the means for the initiating device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the initiating device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor

258, and/or the TX MIMO processor 266 may be performed by or under the control of the controller/processor 280.

As indicated above, FIG. 2 is provided as an example. Other examples may differ from what is described with regard to FIG. 2.

Figure 3:
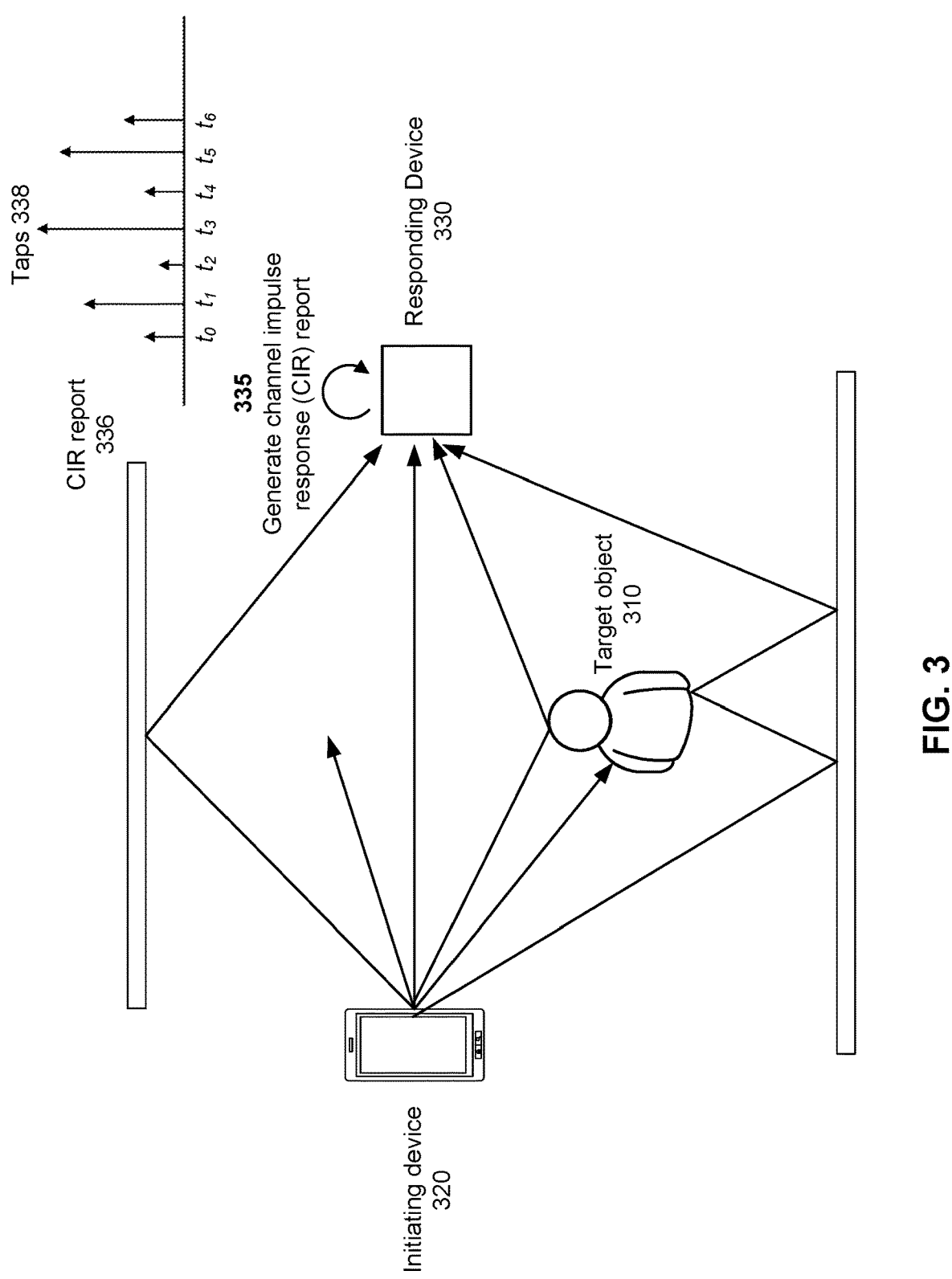
FIGS. 3-4 are diagrams illustrating an example of radio frequency sensing, in accordance with the present disclosure.
Figure 4:
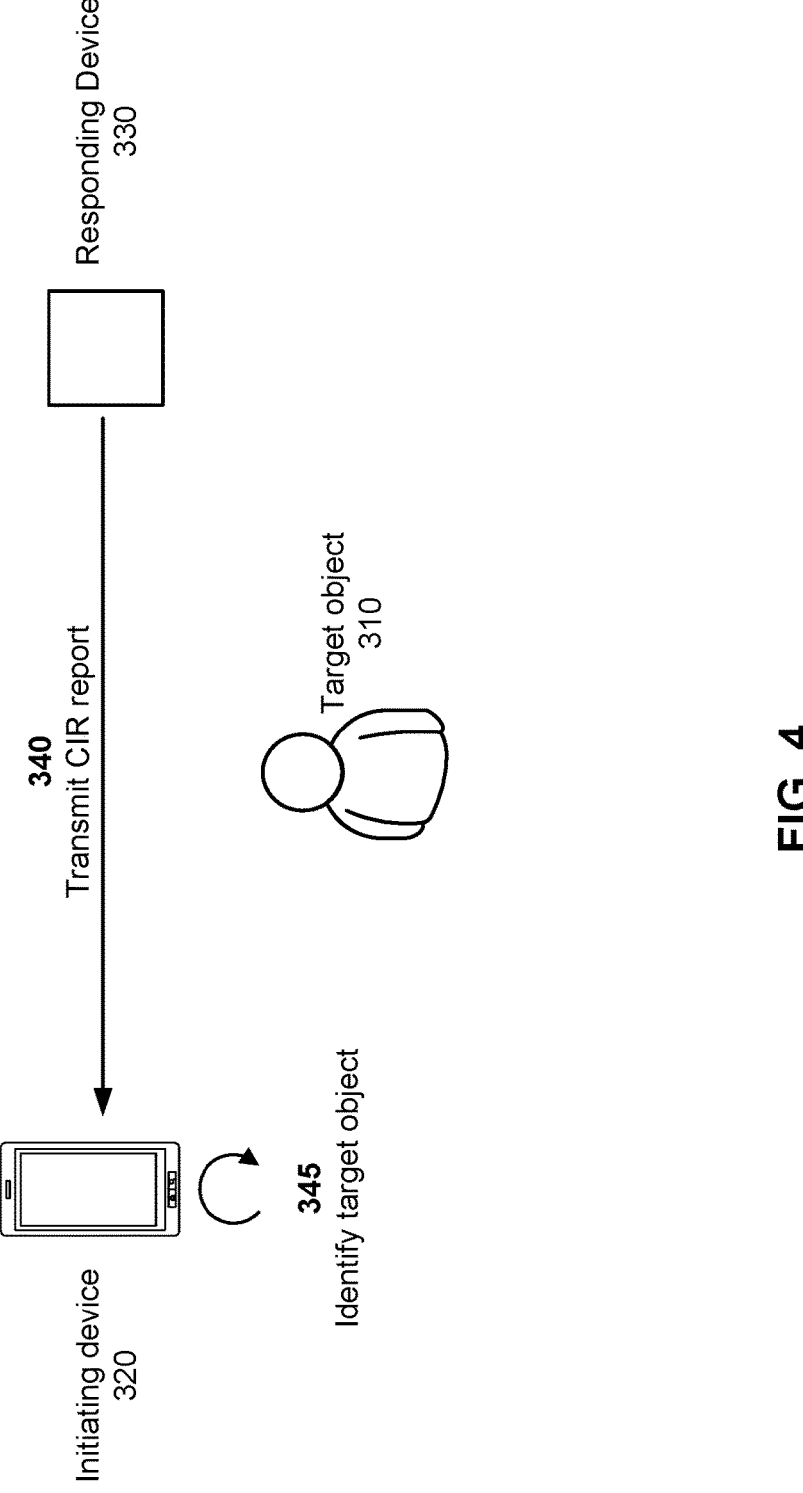

FIGS. 3-4 are diagrams illustrating an example 300 of RF sensing, in accordance with the present disclosure.

RF sensing may be used to identify a target object 310. Example 300 shows an example of bi-static one-way sensing. An initiating device 320 (e.g., a UE 120, a network entity) may transmit a signal that is reflected off of the target object 310 (e.g., a user, another human, a body part, an animal, a robot) and other surfaces. A responding device 330 (e.g., a UE 120, a network entity) may receive the direct signal and reflections of the signal. The responding device 330 may estimate, from the signal, a CIR. While a direct signal may be received, RF sensing may focus on reflected signals and may distinguish reflected signals from the direct signal by strength, time, or other information. The CIR may represent or characterize signal reflections from one or more objects as one or more taps. Taps may indicate a signal strength of reflected signals received at different points in time (e.g., $t_0$, $t_1$, and so forth). As shown by FIG. 3 and by reference number 335, the responding device 330 may generate a CIR report 336 (e.g., CIR measurement report) that includes one or more of the taps 338. As shown by FIG. 4 and by reference number 340, the responding device 330 may transmit the CIR report 336 to the initiating device 320. As shown by reference number 345, the initiating device 320 may identify the target object 310 from the taps 338 of the CIR report 336.

RF sensing has different requirements than wireless communications. In IEEE standard 802.15, UWB data communication does not rely on any channel consistency from one packet to the next. However, for UWB ranging, inconsistent channel measurements from one packet to the next may cause the CIR report 336 for multiple packets to involve what appear to be random taps. As a result, the CIR report 336 may not be useful for RF sensing applications. RF sensing makes inferences about the changes in the environment by measuring changes in the wireless channels. If consistent CIR measurement and reporting is not fulfilled, a wireless device may determine that changes in the measured and reported wireless channel are due to changes in the physical environment and not due to the wireless device itself.

As indicated above, FIGS. 3-4 is provided as an example. Other examples may differ from what is described with regard to FIGS. 3-4.

Figure 5:
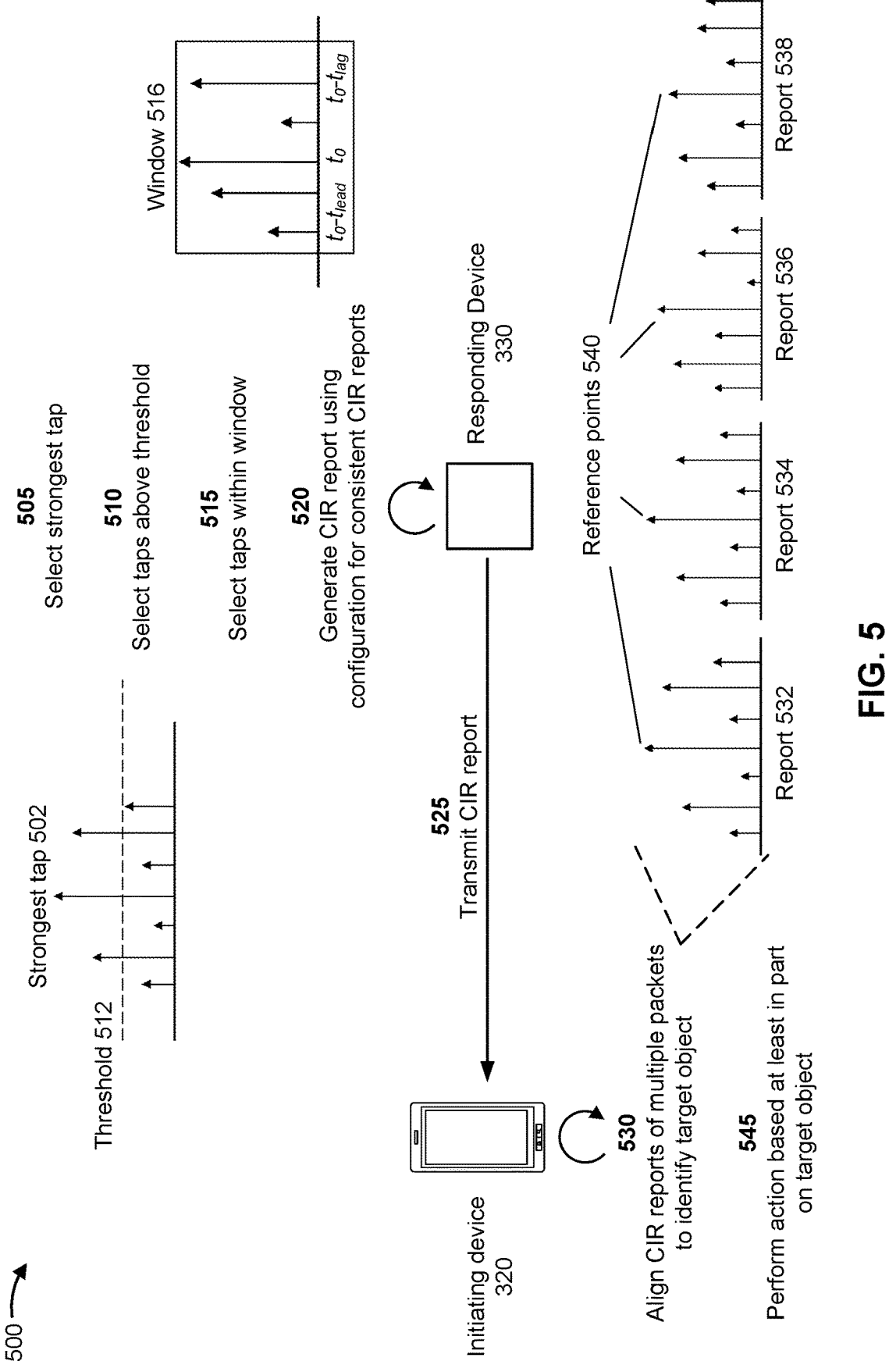
FIG. 5 is a diagram illustrating an example of aligning channel impulse response reports, in accordance with the present disclosure.

FIG. 5 is a diagram illustrating an example 500 of aligning CIR reports, in accordance with the present disclosure.

According to various aspects described herein, the responding device 330 may select one or more reference taps that the initiating device 320 may use to align the CIR report 336 from each of multiple packets. A tap may refer to an energy rise in the channel impulse response at a point in time or at an occasion that may indicate a direct or reflected signal. A tap may appear for detected energy that is not part of a direct or reflected signal and may be due to interfering energy or other noise. The aligning of CIR reports may include aligning CIR reports at least in time. This may include, for example, identifying taps (e.g., that satisfy a threshold) in a first CIR report that occur at the same times or occasions as taps in a second CIR report, such that a tap for a direct or reflected signal in the first CIR report is matched to a tap for the same direct or reflected signal in the second CIR report. By aligning the CIR reports, the initiating device 320 may better identify the target object 310, movement of the target object 310, or other properties of the target object 310. The initiating device 320 may take more appropriate action with better identification of the target object 310 and conserve processing resources and signaling resources. For example, the initiating device may better detect a location of a body part of a user (e.g., human, robot, autonomous device), detect user activity (e.g., gesture or breathing pattern of human or animal), identify an object near the user, or detect movement of objects around the user, among other RF sensing uses.

As shown in example 300 of FIG. 3 and FIG. 4, the initiating device 320 may transmit a signal, and the responding device 330 may receive reflections of the signal off of one or more objects, including the target object 310. Example 500 in FIG. 5 shows alignment of CIR feedback for more accurate RF sensing, starting with the generation of CIR feedback by the responding device 330.

In some aspects, the responding device 330 may be configured (e.g., by the initiating device 320, by another device, or at production) to select one or more reference points to provide in the CIR report 336. A reference point may be an earliest tap, a strongest tap 502, a center of mass of taps, a packet detection time, or any other specified tap or time point. The responding device 330 may use a configuration for providing consistent CIR reports. Consistent CIR reports may be CIR reports that together work to provide accurate RF sensing information for objects. Consistent CIR reports may include CIR reports with information (e.g., taps, reference points) that the initiating device may use to align the CIR reports in time in order to match reflected signals to objects over time, in order to identify objects when movement is involved. The configuration may specify which taps to select for a CIR report, including how many taps before or after a reference point or how long before or after the reference point to collect taps.

In example 500, as shown by reference number 505, the responding device 330 may select the strongest tap 502 from among the taps for a packet of the transmitted signal. In some aspects, the responding device 330 may select the n strongest taps, where n is a configurable parameter that may be specified and adjusted based at least in part on sensing conditions.

In some aspects, as shown by reference number 510, the responding device 330 may select taps that satisfy a tap threshold 512 (e.g., minimum RSRP). This may be in addition to selecting the strongest tap 502. By specifying the selection of stronger taps, insignificant taps may be removed and signaling overhead may be decreased.

In some aspects, the responding device 330 may select all taps between an earliest tap that satisfies the threshold 512 and a latest tap that satisfies the threshold 512. This may provide some additional context for the reflected signals or additional reference taps for alignment without greatly increasing the signaling overhead.

In some aspects, as shown by reference number 515, the responding device 330 may select the taps that fall within a time window 516 of a specified time duration. The time duration may be specified (e.g., in the configuration) by a leading time duration value ($t_{lead}$) before a reference tap ($t_0$) (e.g., strongest tap 502) and a lagging time duration value ($t_{lag}$). The time duration may be a fixed length. In some aspects, the time duration may be large enough to capture important CIR taps expected for the RF sensing application, and the time duration may be adjusted depending on the RF sensing conditions or the RF application. For example, if a line of sight is not blocked between the initiating device 320 and the responding device 330, the strongest tap 502 may be close to the first tap. Therefore, the window may be defined to be asymmetrically around the strongest tap 502. The configuration may specify how many taps to report before and after a reference point like the strongest tap 502. In sum, as shown by reference number 520, the responding device 330 may generate the CIR report 336 using the configuration for consistent CIR reports to select taps to include in the CIR report 336, as described for FIG. 5.

In some aspects, the CIR feedback sampling rate may vary for identifying and selecting taps. For example, the feedback sampling rate may be multiples of a UWB chip rate (e.g., 499.2 MHZ), such as the chip rate, 2 times the chip rate, or 4 times the chip rate.

In some aspects, depending on the range under coverage, the responding device 330 may determine the quantity of taps to use based at least in part on a delay spread to cover the region divided by the chip rate (and a scaling factor). For example, a 10 meter (m) path coverage may use 17 taps at a chip rate of 2 nanoseconds (ns) or 34 taps at twice a chip rate of 1 ns.

In some aspects, the configuration may specify a format for CIR values in the CIR reports. The configuration may specify that a CIR report is to include an amplitude and a phase (e.g., polar domain) for each tap or other CIR value. The configuration may specify that a CIR report is to include an in-phase and quadrature (IQ) value for each tap or other CIR value.

In some aspects, CIR values may be compressed for a CIR report. This may include normalizing tap amplitudes to the strongest tap amplitude. The CIR report may include the normalization factor. The CIR report may include a differential IQ value, which may include a variation in IQ values across packets. In some aspects, a size of a CIR report may be based at least in part on a quantity of bits that are allocated for each tap in the CIR report and a sensing range under coverage and the CIR sampling rate.

As shown by reference number 525, the responding device 330 may transmit the CIR report to the initiating device 320. The responding device 330 may transmit multiple CIR reports for multiple packets, each CIR report for one or more packets. As shown by reference number 530, the initiating device 320 may align the CIR reports to identify at least the target object 310. The initiating device 320 may align the CIR reports to identify other objects. The initiating device 320 may identify the target object 310, a location of the target object 310, movement of the target object 310, or other properties of the target object 310 (alone or in relation to the other objects) by associating taps in the CIR reports with the target object 310. Aligning the CIR reports helps the initiating device 320 to determine which taps in each CIR report correspond to other taps in the other CIR reports.

For example, the initiating device 320 may receive, among other CIR reports, four CIR reports for four packets. Example 500 shows report 532, report 534, report 536, and report 538. Without an appropriate reference point for each report, taps in one report would not be associated with taps in another report and there would be no consistency among the CIR reports. RF sensing would be limited. However, in some aspects, the reports may each have reference point 540. In example 500, the reference points are, for example, the strongest tap 502 in each CIR. The reports in example 500 show multiple taps, but in some aspects, the report may include fewer, stronger taps or include taps in between specified taps.

The initiating device 320 may use the reference points 540 to align the reports and identify signals that correspond to the same object across the reports/packets. The initiating device 320 may use the signals that are matched to objects to identify objects, locations of objects, movements of objects, other properties for specific objects (including the target object 310), or properties of the environment around the objects.

As shown by reference number 545, the initiating device 320 may perform an action based at least in part on the target object 310, a location of the target object 310, a movement of the target object 310, or other properties of the target object 310. Such actions may include transmitting a communication to the target object 310, transmitting a communication to another device that uses an application that involves the target object 310, using the information about the target object 310 in an application (e.g., sensing application, health application, medical application, gaming application, industrial application), transmitting a notification about the target object 310, initiating movement because of the target object 310, or the like.

In example 500, the initiating device 320 may transmit signals toward the responding device 330, which may collect reflected signals. However, in other scenarios, the initiating device 320 and the responding device 330 may be co-located or may be the same device.

In some aspects, the responding device 330 may have multiple antennas that each receive signal reflections. The responding device 330 may generate a CIR report for each antenna. The responding device 330 may transmit separate CIR measurement reports for each antenna in one or multiple CIR reports. This may involve defining a window around each antenna's reference point. If the reference points are different for different antennas, then the responding device 330 may report a relative offset between the reference taps that are selected to be reported.

In some aspects, the responding device 330 may use one window that is defined for all of the multiple antennas. The reference point for the window may include a reference point of the first antenna (or any specified antenna) of the multiple antennas. The reference point may include a reference point that is based on a combined CIR measurement report. The responding device 330 may generate a combined CIR measurement report by adding the amplitude of the taps in the time domain after compensating for hardware delay differences between the antennas.

By using a configuration for consistent CIR reports and aligning CIR reports, a device may improve the accuracy and the functionality of RF sensing.

As indicated above, FIG. 5 is provided as an example. Other examples may differ from what is described with regard to FIG. 5.

FIG. 6 is a diagram illustrating an example process 600 performed, for example, by a responding device, in accordance with the present disclosure. Example process 600 is an example where the responding device (e.g., responding device 330) performs operations associated with RF sensing.

As shown in FIG. 6, in some aspects, process 600 may include receiving a signal from an initiating device (block 610). For example, the responding device (e.g., using communication manager 140 or 150 and/or reception component 802 depicted in FIG. 8) may receive a signal from an initiating device, as described above.

As shown in FIG. 6, in some aspects, process 600 may include estimating, from the signal, a CIR that represents signal reflections from one or more objects as multiple taps (block 620). For example, the responding device (e.g., using communication manager 140 or 150 and/or estimation component 808 depicted in FIG. 8) may estimate, from the signal, a CIR that represents signal reflections from one or more objects as multiple taps, as described above.

As further shown in FIG. 6, in some aspects, process 600 may include selecting one or more taps from the multiple taps based at least in part on a configuration for providing consistent CIR reports (block 630). For example, the responding device (e.g., using communication manager 140 or 150 and/or selection component 810 depicted in FIG. 8) may select one or more taps from the multiple taps based at least in part on a configuration for providing consistent CIR reports, as described above.

As further shown in FIG. 6, in some aspects, process 600 may include transmitting, to the initiating device, a CIR report that indicates the one or more taps (block 640). For example, the responding device (e.g., using communication manager 140 or 150 and/or transmission component 804 depicted in FIG. 8) may transmit, to the initiating device, a CIR report that indicates the one or more taps, as described above.

Process 600 may include additional aspects, such as any single aspect or any combination of aspects described below and/or in connection with one or more other processes described elsewhere herein.

In a first aspect, selecting the one or more taps includes selecting a strongest tap.

In a second aspect, alone or in combination with the first aspect, selecting the one or more taps includes selecting taps that satisfy a tap threshold.

In a third aspect, alone or in combination with one or more of the first and second aspects, selecting the one or more taps includes selecting a specified quantity of strongest taps.

In a fourth aspect, alone or in combination with one or more of the first through third aspects, selecting the one or more taps includes selecting taps between an earliest tap that satisfies a tap threshold and a latest tap that satisfies the tap threshold. The one or more taps may include all taps between the earliest tap and the latest tap.

In a fifth aspect, alone or in combination with one or more of the first through fourth aspects, selecting the one or more taps includes selecting taps within a time window having a specified time duration.

In a sixth aspect, alone or in combination with one or more of the first through fifth aspects, the time window is formed based at least in part on a reference point.

In a seventh aspect, alone or in combination with one or more of the first through sixth aspects, the reference point includes an earliest tap, a strongest tap, a packet detection time, or a center of mass for the multiple taps.

In an eighth aspect, alone or in combination with one or more of the first through seventh aspects, the configuration specifies selection of a first specified quantity of taps before a reference point and a second specified quantity of taps after a reference point.

In a ninth aspect, alone or in combination with one or more of the first through eighth aspects, the configuration specifies selection of taps in a first specified time duration before a reference point and taps in a second specified time duration after the reference point.

In a tenth aspect, alone or in combination with one or more of the first through ninth aspects, selecting the one or more taps includes selecting the one or more taps based at least in part on a sampling rate for the CIR report.

In an eleventh aspect, alone or in combination with one or more of the first through tenth aspects, the CIR report indicates, for each tap in the CIR report, an amplitude and a phase.

In a twelfth aspect, alone or in combination with one or more of the first through eleventh aspects, the CIR indicates, for each tap in the CIR report, an in-phase and quadrature value.

In a thirteenth aspect, alone or in combination with one or more of the first through twelfth aspects, the CIR report indicates, for each tap in the CIR report, a difference between an IQ value and a previous IQ value.

In a fourteenth aspect, alone or in combination with one or more of the first through thirteenth aspects, the CIR report includes a separate CIR measurement report for each antenna of multiple antennas.

In a fifteenth aspect, alone or in combination with one or more of the first through fourteenth aspects, the CIR measurement report for each antenna is based at least in part on taps in a window defined around a reference point for the antenna.

In a sixteenth aspect, alone or in combination with one or more of the first through fifteenth aspects, the CIR report includes a combined CIR measurement report for multiple antennas. In some aspects, the CIR measurement report for each antenna may be based at least in part on taps in a window defined around a reference point for each of the antennas and the offset value for the reference points across antennas. The offset between the reference points across antennas may be reported. In some aspects, the CIR report may include or be based at least in part on separate CIR measurement reports for each of multiple antennas with different reference points for a time window in which to select taps.

In a seventeenth aspect, alone or in combination with one or more of the first through sixteenth aspects, the CIR report includes a combined CIR measurement report that is based at least in part on taps in a window defined for all of the multiple antennas and a reference point of a specified antenna (e.g., first antenna or other antenna) of the multiple antennas or a reference point that is associated with the combined CIR measurement report.

In an eighteenth aspect, alone or in combination with one or more of the first through seventeenth aspects, the CIR report includes a CIR measurement report for a reference antenna and complex differences for other antennas relative to the reference antenna.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by an initiating device, in accordance with the present disclosure. Example process 700 is an example where the initiating device (e.g., initiating device 320) performs operations associated with RF sensing.

As shown in FIG. 7, in some aspects, process 700 may include transmitting a signal that includes multiple packets (block 710). For example, the initiating device (e.g., using communication manager 140 or 150 and/or transmission component 904 depicted in FIG. 9) may transmit a signal that includes multiple packets, as described above.

As further shown in FIG. 7, in some aspects, process 700 may include receiving, from a responding device, a CIR report for each packet of the multiple packets (block 720).

Figure 9:
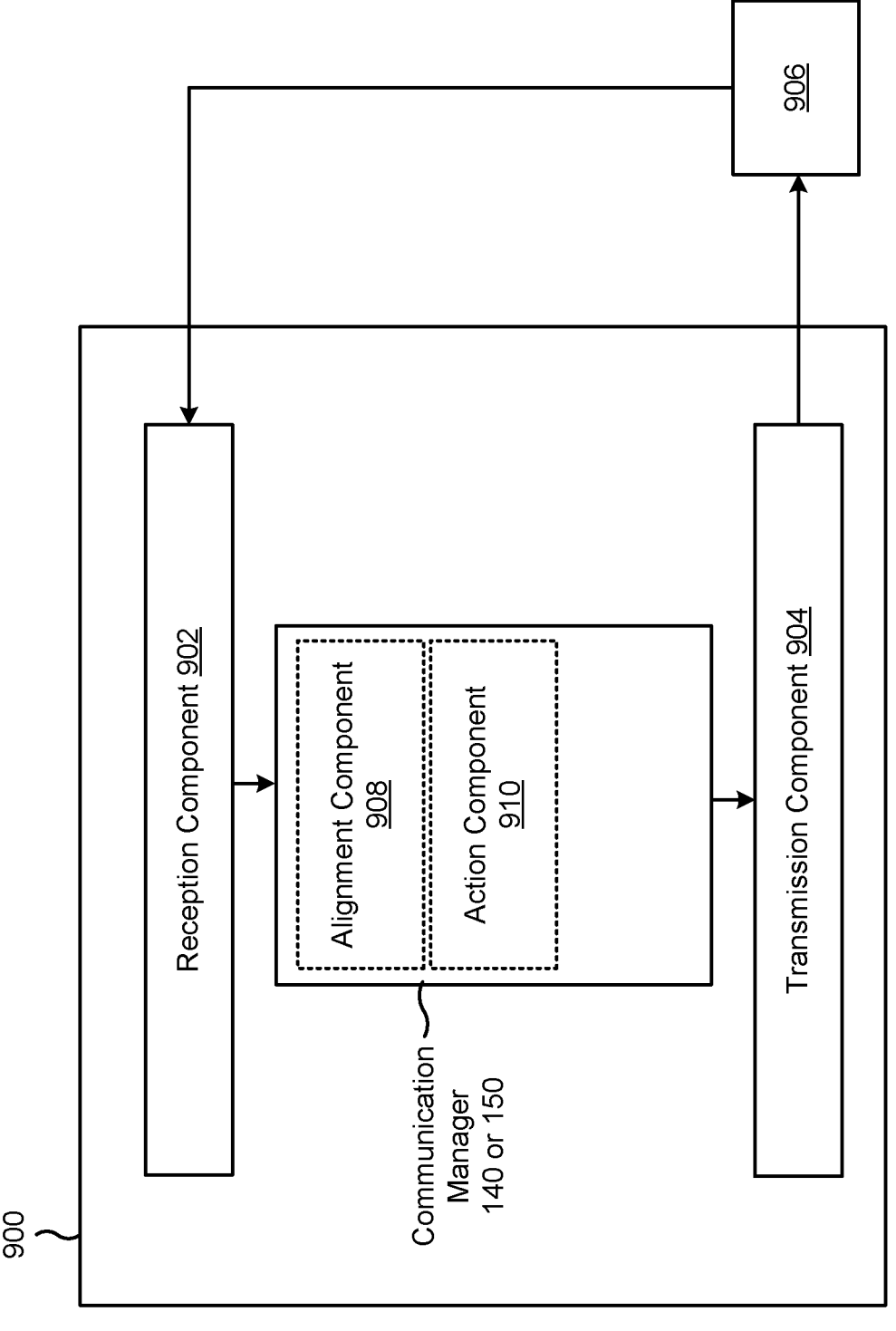

For example, the initiating device (e.g., using communication manager 140 or 150 and/or reception component 902 depicted in FIG. 9) may receive, from a responding device, a CIR report for each packet of the multiple packets, as described above.

As further shown in FIG. 7, in some aspects, process 700 may include aligning, using one or more taps in the CIR report for each packet, the CIR reports across the multiple packets to identify a target object, a location of the target object, or a movement of the target object (block 730). For example, the initiating device (e.g., using communication manager 140 or 150 and/or alignment component 908 depicted in FIG. 9) may align, using one or more taps in the CIR report for each packet, the CIR reports across the multiple packets to identify a target object, a location of the target object, or a movement of the target object, as described above.

As further shown in FIG. 7, in some aspects, process 700 may include performing an action based at least in part on the target object, the location of the target object, or the movement of the target object (block 740). For example, the initiating device (e.g., using communication manager 140 or 150 and/or action component 910 depicted in FIG. 9) may perform an action based at least in part on the target object, the location of the target object, or the movement of the target object, as described above.

Process 700 may include additional aspects, such as any single aspect or any combination of aspects described below and/or in connection with one or more other processes described elsewhere herein.

In a first aspect, aligning the CIR reports includes aligning the CIR reports based at least in part on the strongest tap in each CIR report.

In a second aspect, alone or in combination with the first aspect, aligning the CIR reports includes aligning the CIR reports further based at least in part on taps selected in accordance with specific tap selections indicated in the configuration.

In a third aspect, alone or in combination with one or more of the first and second aspects, aligning the CIR reports includes aligning the CIR reports further based at least in part on, for each CIR report, an earliest tap that satisfies a tap threshold and a latest tap that satisfies the tap threshold.

In a fourth aspect, alone or in combination with one or more of the first through third aspects, process 700 includes transmitting, to the responding device, a configuration for selecting taps for a CIR report.

In a fifth aspect, alone or in combination with one or more of the first through fourth aspects, the configuration specifies, for tap selection, a time window of a specified time duration and a reference point for the time window.

In a sixth aspect, alone or in combination with one or more of the first through fifth aspects, the configuration specifies, for tap selection, a first specified quantity of taps before a reference point and a second specified quantity of taps after the reference point.

In a seventh aspect, alone or in combination with one or more of the first through sixth aspects, the configuration specifies, for tap selection, taps in a first specified time duration before a reference point and taps in a second specified time duration after the reference point.

In an eighth aspect, alone or in combination with one or more of the first through seventh aspects, the CIR report includes, for each tap in the CIR report, an amplitude, a phase, an IQ value, a difference between the IQ value and a previous IQ value, or a combination thereof.

In a ninth aspect, alone or in combination with one or more of the first through eighth aspects, the CIR report includes a separate CIR measurement report for each antenna of multiple antennas or a combined CIR measurement report for the multiple antennas, and aligning the CIR reports includes aligning the CIR reports separately for each antenna of the multiple antennas.

In a tenth aspect, alone or in combination with one or more of the first through ninth aspects, the CIR report includes a CIR measurement report for a reference antenna and complex differences for other antennas relative to the reference antenna, and aligning the CIR reports includes aligning the CIR reports for the reference antenna and for the other antennas.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
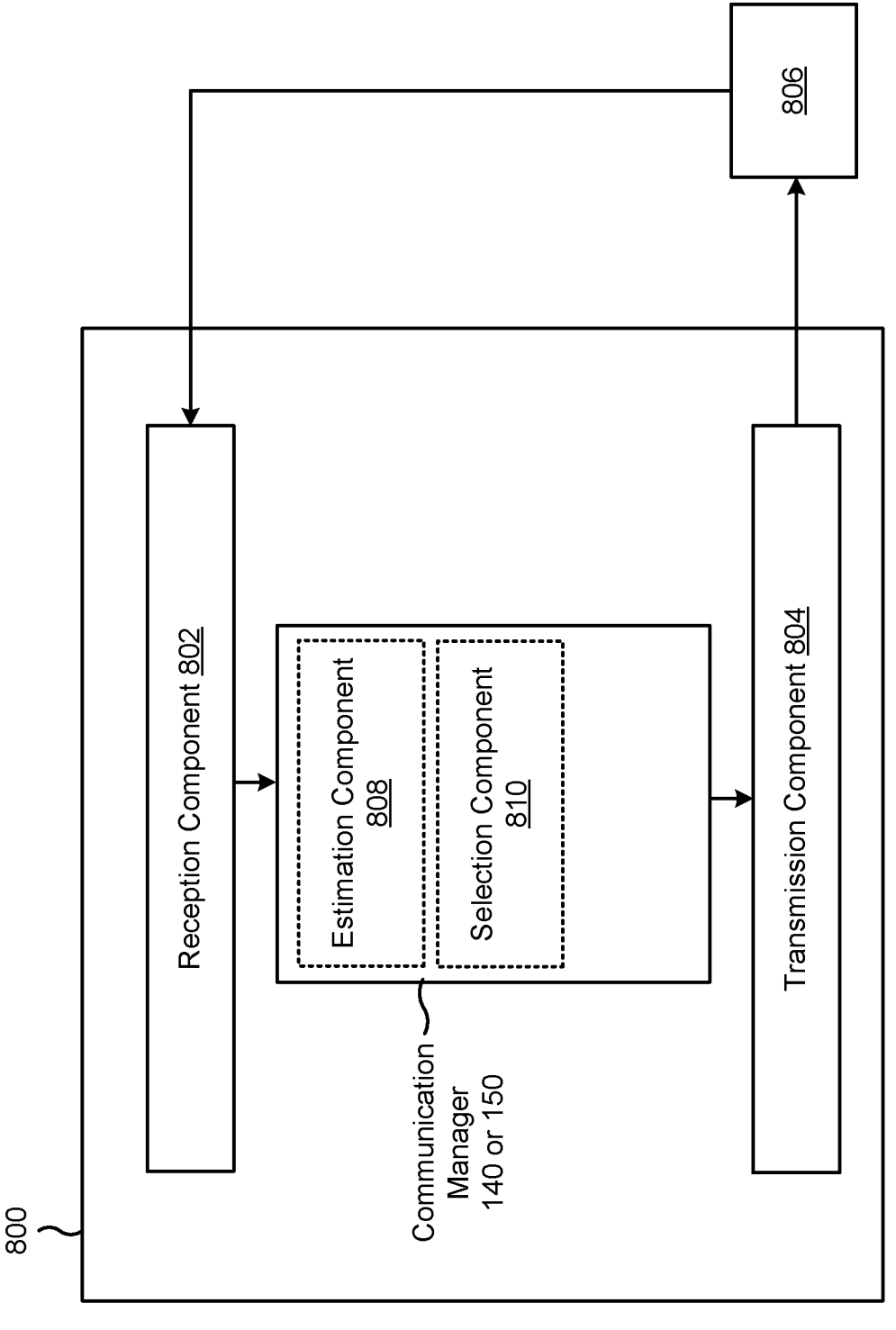
FIGS. 8-9 are diagrams of example apparatuses for wireless communication, in accordance with the present disclosure.

FIG. 8 is a diagram of an example apparatus 800 for wireless communication. The apparatus 800 may be a responding device (e.g., responding device 330), or a responding device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140 or 150. The communication manager 140 or 150 may include an estimation component 808 and/or selection component 810, among other examples.

In some aspects, the apparatus 800 may be configured to perform one or more operations described herein in connection with FIGS. 1-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the responding device described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the responding device described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the responding device described in connection with FIG. 2. In some aspects, the transmission component 804 may be co-located with the reception component 802 in a transceiver.

The reception component 802 may receive a signal from an initiating device. The estimation component 808 may estimate, from the signal, a CIR that represents signal reflections from one or more objects as multiple taps. The selection component 810 may select one or more taps from the multiple taps based at least in part on a configuration for providing consistent CIR reports. The transmission component 804 may transmit, to the initiating device, a CIR report that indicates the one or more taps.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

FIG. 9 is a diagram of an example apparatus 900 for wireless communication. The apparatus 900 may be an initiating device (e.g., initiating device 320), or an initiating device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140 or 150. The communication manager 140 or 150 may include an alignment component 908 and/or an action component 910, among other examples.

In some aspects, the apparatus 900 may be configured to perform one or more operations described herein in connection with FIGS. 1-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the initiating device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the initiating device described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the initiating device described in connection with FIG. 2. In some aspects, the transmission component 904 may be co-located with the reception component 902 in a transceiver.

The transmission component 904 may transmit a signal that includes multiple packets. The reception component 902 may receive, from a responding device, a CIR report for each packet of the multiple packets. The alignment component 908 may align, using one or more taps in the CIR report for each packet, the CIR reports across the multiple packets to identify a target object, a location of the target object, or a movement of the target object. The action component 910 may perform an action based at least in part on the target object, the location of the target object, or the movement of the target object.

The transmission component 904 may transmit, to the responding device, a configuration for selecting taps for a CIR report.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a responding device, comprising: receiving a signal from an initiating device; estimating, from the signal, a channel impulse response (CIR) that represents signal reflections from one or more objects as multiple taps; selecting one or more taps from the multiple taps based at least in part on a configuration for providing consistent CIR reports; and transmitting, to the initiating device, a CIR report that indicates the one or more taps.

Aspect 2: The method of Aspect 1, wherein selecting the one or more taps includes selecting a strongest tap.

Aspect 3: The method of Aspect 2, wherein selecting the one or more taps includes selecting taps that satisfy a tap threshold.

Aspect 4: The method of any of Aspects 1-3, wherein selecting the one or more taps includes selecting a specified quantity of strongest taps.

Aspect 5: The method of any of Aspects 1-4, wherein selecting the one or more taps includes selecting taps between an earliest tap that satisfies a tap threshold and a latest tap that satisfies the tap threshold.

Aspect 6: The method of any of Aspects 1-5, wherein selecting the one or more taps includes selecting taps within a time window having a specified time duration.

Aspect 7: The method of Aspect 6, wherein the time window is formed based at least in part on a reference point.

Aspect 8: The method of Aspect 6 or 7, wherein the reference point includes an earliest tap, a strongest tap, a packet detection time, or a center of mass for the multiple taps.

Aspect 9: The method of any of Aspects 6-8, wherein the configuration specifies selection of a first specified quantity of taps before the reference point and a second specified quantity of taps after the reference point.

Aspect 10: The method of any of Aspects 6-9, wherein the configuration specifies selection of taps in a first specified time duration before the reference point and taps in a second specified time duration after the reference point.

Aspect 11: The method of any of Aspects 1-10, wherein selecting the one or more taps includes selecting the one or more taps based at least in part on a sampling rate for the CIR report.

Aspect 12: The method of any of Aspects 1-11, wherein the CIR report indicates, for each tap in the CIR report, an amplitude and a phase.

Aspect 13: The method of any of Aspects 1-12, wherein the CIR indicates, for each tap in the CIR report, an in-phase and quadrature value.

Aspect 14: The method of any of Aspects 1-13, wherein the CIR report indicates, for each tap in the CIR report, a difference between an in-phase and quadrature value and a previous in-phase and quadrature value.

Aspect 15: The method of any of Aspects 1-14, wherein the CIR report includes a separate CIR measurement report for each antenna of multiple antennas.

Aspect 16: The method of Aspect 15, wherein the CIR measurement report for each antenna is based at least in part on taps in a window defined around a reference point for the antenna.

Aspect 17: The method of any of Aspects 1-14, wherein the CIR report is based at least in part on separate CIR measurement reports for each of multiple antennas with different reference points for a time window in which to select taps.

Aspect 18: The method of Aspect 17, wherein the CIR report includes a combined CIR measurement report that is based at least in part on taps in a window defined for all of the multiple antennas and a reference point of a specified antenna of the multiple antennas or a reference point that is associated with the combined CIR measurement report.

Aspect 19: The method of any of Aspects 1-18, wherein the CIR report includes a CIR measurement report for a reference antenna and complex differences for other antennas relative to the reference antenna.

Aspect 20: A method of radio frequency (RF) sensing performed by an initiating device, comprising: transmitting a signal that includes multiple packets; receiving, from a responding device, a channel impulse response (CIR) report for each packet of the multiple packets; aligning, using one or more taps in the CIR report for each packet, the CIR reports across the multiple packets to identify a target object, a location of the target object, or a movement of the target object; and performing an action based at least in part on the target object, the location of the target object, or the movement of the target object.

Aspect 21: The method of Aspect 20, wherein aligning the CIR reports includes aligning the CIR reports based at least in part on the strongest tap in each CIR report.

Aspect 22: The method of Aspect 21, wherein aligning the CIR reports includes aligning the CIR reports further based at least in part on the taps in each CIR report that satisfy a tap threshold.

Aspect 23: The method of any of Aspects 20-22, wherein aligning the CIR reports includes aligning the CIR reports further based at least in part on, for each CIR report, an earliest tap that satisfies a tap threshold and a latest tap that satisfies the tap threshold.

Aspect 24: The method of any of Aspects 20-23, further comprising transmitting, to the responding device, a configuration for selecting taps for a CIR report.

Aspect 25: The method of Aspect 24, wherein the configuration specifies, for tap selection, a time window of a specified time duration and a reference point for the time window.

Aspect 26: The method of Aspect 24 or 25, wherein the configuration specifies, for tap selection, a first specified quantity of taps before a reference point and a second specified quantity of taps after the reference point.

Aspect 27: The method of any of Aspects 24-26, wherein the configuration specifies, for tap selection, taps in a first specified time duration before a reference point and taps in a second specified time duration after the reference point.

Aspect 28: The method of any of Aspects 20-27, wherein the CIR report includes, for each tap in the CIR report, an amplitude, a phase, an in-phase and quadrature value, a difference between the in-phase and quadrature value and a previous in-phase and quadrature value, or a combination thereof.

Aspect 29: The method of any of Aspects 20-28, wherein the CIR report includes a separate CIR measurement report for each antenna of multiple antennas or a combined CIR measurement report for the multiple antennas, and wherein aligning the CIR reports includes aligning the CIR reports separately for each antenna of the multiple antennas.

Aspect 30: The method of any of Aspects 20-29, wherein the CIR report includes a CIR measurement report for a reference antenna and complex differences for other antennas relative to the reference antenna, and wherein aligning the CIR reports includes aligning the CIR reports for the reference antenna and for the other antennas.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A responding device for wireless communication, comprising:
a memory; and
one or more processors, coupled to the memory, configured to:
receive a signal from an initiating device;
estimate, from the signal, a channel impulse response (CIR) that represents signal reflections from one or more objects as multiple taps;
select one or more taps from the multiple taps based at least in part on a configuration for providing CIR reports in accordance with a time window of specified time duration determined in relation to a reference point; and
transmit, to the initiating device, a CIR report that indicates the one or more taps, wherein the one or more processors, to select the one or more taps, are configured to select taps between an earliest tap that satisfies a tap threshold and a latest tap that satisfies the tap threshold.

2. The responding device of claim 1, wherein the one or more processors, to select the one or more taps, are configured to select a strongest tap.

3. The responding device of claim 2, wherein the one or more processors, to select the one or more taps, are configured to select taps that satisfy a tap threshold.

4. The responding device of claim 1, wherein the one or more processors, to select the one or more taps, are configured to select a specified quantity of strongest taps.

5. The responding device of claim 1, wherein the one or more processors, to select the one or more taps, are configured to select taps within the time window having the specified time duration.

6. The responding device of claim 5, wherein the time window is formed based at least in part on the reference point.

7. The responding device of claim 6, wherein the reference point includes an earliest tap, a strongest tap, a packet detection time, or a center of mass for the multiple taps.

8. The responding device of claim 6, wherein the configuration specifies selection of taps in a first specified time duration before the reference point and taps in a second specified time duration after the reference point.

9. The responding device of claim 1, wherein the one or more processors, to select the one or more taps, are configured to select the one or more taps based at least in part on a sampling rate for the CIR report.

10. The responding device of claim 1, wherein the CIR report indicates, for each tap in the CIR report, an amplitude and a phase.

11. The responding device of claim 1, wherein the CIR indicates, for each tap in the CIR report, an in-phase and quadrature value.

12. The responding device of claim 1, wherein the CIR report indicates, for each tap in the CIR report, a difference between an in-phase and quadrature value and a previous in-phase and quadrature value.

13. The responding device of claim 1, wherein the CIR report includes a separate CIR measurement report for each antenna of multiple antennas.

14. The responding device of claim 13, wherein the CIR measurement report for each antenna is based at least in part on taps in a window defined around a reference point for the antenna.

15. The responding device of claim 1, wherein the CIR report is based at least in part on separate CIR measurement reports for each of multiple antennas with different reference points for a time window in which to select taps.

16. The responding device of claim 15, wherein the CIR report includes a combined CIR measurement report that is based at least in part on taps in a window defined for all of the multiple antennas and a reference point of a specified antenna of the multiple antennas or a reference point that is associated with the combined CIR measurement report.

17. The responding device of claim 1, wherein the CIR report includes a CIR measurement report for a reference antenna and complex differences for other antennas relative to the reference antenna.

18. A responding device for wireless communication, comprising:

a memory; and one or more processors, coupled to the memory, configured to:

receive a signal from an initiating device;

estimate, from the signal, a channel impulse response (CIR) that represents signal reflections from one or more objects as multiple taps;

select one or more taps from the multiple taps based at least in part on a configuration for providing CIR reports in accordance with a time window of specified time duration determined in relation to a reference point; and transmit, to the initiating device, a CIR report that indicates the one or more taps, wherein the one or more processors, to select the one or more taps, are configured to select taps within the time window having the specified time duration, wherein the time window is formed based at least in part on the reference point, and wherein the configuration specifies selection of a first specified quantity of taps before the reference point and a second specified quantity of taps after the reference point.

19. An initiating device for wireless communication, comprising:

a memory; and one or more processors, coupled to the memory, configured to:

transmit a signal that includes multiple packets;

receive, from a responding device, a channel impulse response (CIR) report for each packet of the multiple packets;

align, using one or more taps in the CIR report for each packet, the CIR reports across the multiple packets to identify a target object, a location of the target object, or a movement of the target object; and perform an action based at least in part on the target object, the location of the target object, or the movement of the target object, wherein the one or more processors, to align the CIR reports, are configured to align the CIR reports further based at least in part on, for each CIR report, an earliest tap that satisfies a tap threshold and a latest tap that satisfies the tap threshold.

20. The initiating device of claim 19, wherein the one or more processors, to align the CIR reports, are configured to align the CIR reports based at least in part on the strongest tap in each CIR report.

21. The initiating device of claim 19, wherein the one or more processors are configured to transmit, to the responding device, a configuration for selecting taps for the CIR report.

22. The initiating device of claim 21, wherein the configuration specifies, for tap selection, a time window of a specified time duration and a reference point for the time window.

23. An initiating device for wireless communication, comprising:

a memory; and one or more processors, coupled to the memory, configured to:

transmit a signal that includes multiple packets;

receive, from a responding device, a channel impulse response (CIR) report for each packet of the multiple packets;

align, using one or more taps in the CIR report for each packet, the CIR reports across the multiple packets to identify a target object, a location of the target object, or a movement of the target object; and perform an action based at least in part on the target object, the location of the target object, or the movement of the target object, wherein the one or more processors are configured to transmit, to the responding device, a configuration for selecting taps for the CIR report, wherein the configuration specifies, for tap selection, a first specified quantity of taps before a reference point and a second specified quantity of taps after the reference point.

24. The initiating device of claim 21, wherein the configuration specifies, for tap selection, taps in a first specified time duration before the reference point and taps in a second specified time duration after the reference point.

25. A method of wireless communication performed by a responding device, comprising:

receiving a signal from an initiating device;

estimating, from the signal, a channel impulse response (CIR) that represents signal reflections from one or more objects as multiple taps;

selecting one or more taps from the multiple taps based at least in part on a configuration for providing CIR reports in accordance with a window of specified time duration determined in relation to a reference point; and transmitting, to the initiating device, a CIR report that indicates the one or more taps, wherein the one or more taps are selected between an earliest tap that satisfies a tap threshold and a latest tap that satisfies the tap threshold.

26. A method of wireless communication performed by an initiating device, comprising:

transmitting a signal that includes multiple packets;

receiving, from a responding device, a channel impulse response (CIR) report for each packet of the multiple packets;

aligning, using one or more taps in the CIR report for each packet, the CIR reports across the multiple packets to identify a target object, a location of the target object, or a movement of the target object; and performing an action based at least in part on the target object, the location of the target object, or the movement of the target object, wherein, to align the CIR reports, the CIR reports are aligned further based at least in part on, for each CIR report, an earliest tap that satisfies a tap threshold and a latest tap that satisfies the tap threshold.

27. The method of claim 26, wherein aligning the CIR reports includes aligning the CIR reports based at least in part on the strongest tap in each CIR report.

28. The method of claim 26, further comprising transmitting a configuration that specifies, for tap selection, a time window of a specified time duration and a reference point for the time window.

* * * * *